(12) United States Patent
Zielnicki et al.

(10) Patent No.: US 12,688,523 B1
(45) Date of Patent: Jul. 21, 2026

(54) MULTIDOMAIN TIME SERIES RECOMMENDATION

(71) Applicant: Stitch Fix, Inc., San Francisco, CA (US)

(72) Inventors: Kevin J. Zielnicki, Oakland, CA (US); Dirk D. Sierag, Seattle, WA (US)

(73) Assignee: Stitch Fix, Inc., San Francisco, CA (US)

( * ) Notice: Subject to any disclaimer, the term of this patent is extended or adjusted under 35 U.S.C. 154(b) by 908 days.

(21) Appl. No.: 17/970,414

(22) Filed: Oct. 20, 2022

Related U.S. Application Data

(60) Provisional application No. 63/347,305, filed on May 31, 2022.

(51) Int. Cl.
| | |
|---|---|
| *G06Q 30/0601* | (2023.01) |
| *G06F 18/2413* | (2023.01) |
| *G06N 3/08* | (2023.01) |
| *G06N 5/022* | (2023.01) |
| *G06N 20/00* | (2019.01) |

(52) U.S. Cl.
CPC ......... *G06Q 30/0631* (2013.01); *G06N 20/00* (2019.01); *G06F 18/2413* (2023.01); *G06N 3/08* (2013.01); *G06N 5/022* (2013.01)

(58) Field of Classification Search
CPC ...... G06Q 30/0631; G06N 20/00; G06N 3/08; G06N 5/022; G06F 18/2413
See application file for complete search history.

(56) References Cited

U.S. PATENT DOCUMENTS

| | | | | |
|---|---|---|---|---|
| 11,544,796 | B1 * | 1/2023 | Mohamed | G06N 3/0985 |
| 2020/0349430 | A1 * | 11/2020 | Schmidtler | G06N 5/02 |
| 2020/0387812 | A1 * | 12/2020 | Lewis | G06N 20/20 |
| 2022/0019888 | A1 * | 1/2022 | Aggarwal | G06N 3/088 |
| 2022/0198339 | A1 * | 6/2022 | Zhao | G06F 18/214 |

OTHER PUBLICATIONS

Gu et al., "Deep Multifaceted Transformers for Multi-objective Ranking in Large-Scale E-commerce Recommender Systems", CIKM '20, Oct. 19-23, 2020, Virtual Event, Ireland.

* cited by examiner

*Primary Examiner* — Quoc A Tran
(74) *Attorney, Agent, or Firm* — Van Pelt, Yi & James LLP

(57) ABSTRACT

Events are captured from a plurality of source domains by a plurality of entities for a plurality of different physical items. The events are captured as time series data to generate a unified machine learning embedding. The unified machine learning embedding is used for predictions in different domains of a plurality of prediction target domains.

20 Claims, 11 Drawing Sheets

101 — Capture Update Events From Multiple Source Domains

103 — Generate Unified Machine Learning Embedding Using Captured Events

105 — Predict Results For Target Domain Using Unified Machine Learning Embedding 107 — Apply Prediction Results For Item Selection 201 — Detect New Update Event 203 — Create New Update Event 205 — Encode Payload Data For New Update Event 207 — Transform Event Update To Fixed Encoder Input Space 301 — Receive Time-Series Event Updates 303 — Receive Hidden Client Embedding 305 — Transform Inputs Into Client Embedding 307 — Update Client Embedding Using Gated Update 309 — Deploy Unified Client Embedding 401 ～ Receive Prediction Target Domain Configuration 403 ～ Receive Prediction Request For Target Domain 405 ～ Retrieve Updated Unified Client Embedding 407 ～ Predict Results For Target Domain 409 ～ Decode And Apply Prediction Target Result

Many-to-one-to-many

MULTIDOMAIN TIME SERIES RECOMMENDATION

CROSS REFERENCE TO OTHER APPLICATIONS

This application claims priority to U.S. Provisional Patent Application No. 63/347,305 entitled MULTIDOMAIN TIME SERIES MODEL filed May 31, 2022, which is incorporated herein by reference for all purposes.

BACKGROUND OF THE INVENTION

Determining item recommendations for clients can be difficult. In particular, the success of item recommendations for clothing and similar fashion-related products can be dependent on a variety of factors including the client's style preferences, sizing, pricing, and available current and future inventory. For any group of clients, their style preferences, sizes, price points, and needs can differ. Another important factor to consider is inventory. Inventory factors can include the vast number of different items as well the quantity available for a specific item.

BRIEF DESCRIPTION OF THE DRAWINGS

Various embodiments of the invention are disclosed in the following detailed description and the accompanying drawings.

DETAILED DESCRIPTION

Figure 1:
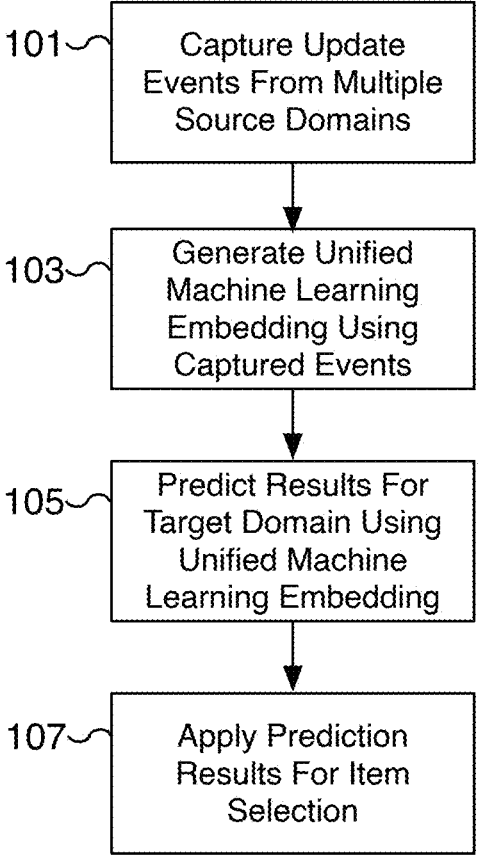
FIG. 1 is a flow diagram illustrating an embodiment of a process for predicting a recommendation using a multidomain time series recommendation process.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Multidomain time series recommendation is disclosed. For example, a recommendation process captures time-stamped events from multiple domains to create a unified machine learning model. The unified machine learning model is trained to learn a client's embedding across multiple domains. For example, a personalized apparel business can recommend different outfit items to a client across a variety of platforms including a mobile app, a website, and/or a home delivery styling service, among others. Events observed on each of these platform domains are captured as time-series events and used to create a unified client embedding. In various embodiments, the event updates are utilized to create a unified machine learning embedding for performing recommendations across different prediction target domains. For example, a multidomain time series model utilizing a unified machine learning embedding can be used for prediction targets for multiple platforms regardless of where the event updates are sourced from. By incorporating events from multiple domains, the unified machine learning embedding captures a client's preferences as observed across all platforms. Moreover, using the unified machine learning embedding to predict across multiple target domains ensures a consistent user experience for each of the different supported target domain platforms. For example, the prediction scores for client item recommendations when the client is shopping on a mobile app compared to the prediction scores for item recommendations for a stylist preparing a custom arrangement of items for the client as part of a home delivery styling service are based on the combined learnings across the different platforms and are consistent regardless of the prediction target domain.

In some embodiments, events are captured from a plurality of source domains by a plurality of entities for a plurality of different physical items as time series data to generate a unified machine learning embedding. For example, update events are observed across multiple domains and are captured by encoding the source domain, the client, and a time stamp of the event. The update events are created for different source domains, which can include different platforms or services offering related services associated with different physical items for the same client. The update event is further encoded with a payload that describes the observed event such as details related to viewing a certain physical item, selecting a certain number of physical item types, providing a survey response to physical items that are kept as well as returned, updating client preferences including client sizes, and/or providing preferences related for desired physical items, among other events related to different physical items. Once captured, the event updates are used to generate a unified machine learning embedding of a multi-domain time series model. Although at times the techniques disclosed herein are described with respect to physical items, the techniques are also applicable to the recommendation of non-physical items, such as videos, photos, ads, non-fungible tokens (NFTs), and/or articles, among other non-physical items. For example, events can be captured from a plurality of source domains by a plurality of entities for a plurality of different non-physical items as time series data to generate a unified machine learning embedding.

In some embodiments, the unified machine learning embedding is used for predictions in different domains of a plurality of prediction target domains. For example, the unified machine learning embedding trained using the captured events is used to predict results for different prediction target domains, such as for different platforms where different physical and/or non-physical items are recommended. The model is unified since it encodes the combined learnings for a client across the different source domains. By utilizing time-series events, the unified client embedding reflects changes in client's preferences over time. In various embodiments, the unified machine learning embedding can be used to predict recommendation scores related to different physical and/or non-physical items for a specific client for different prediction target domains. For example, for a website shopping experience, physical items can be ranked based on the likelihood the client will purchase the item and can be presented in rank ordering. As another example, for a home delivery styling service, a stylist can select from items that have been ranked and filtered using the client's unified machine learning embedding.

FIG. 1 is a flow diagram illustrating an embodiment of a process for predicting a recommendation using a multidomain time series recommendation process. Using the disclosed process, a multidomain time series recommendation process utilizes event updates observed across different source domains to predict recommendations for multiple target domains. The event updates are timestamped and used to create a unified machine learning embedding of a multi-domain time series model. In various embodiments, the multidomain time series model is used for predicting scores targeting different prediction target domains. For example, the model can be applied to predict recommendation scores for different physical and/or non-physical items for use in different platform domains, such as a mobile app, a website, and/or a home delivery styling service, among others. In various embodiments, the process of FIG. 1 can be repeated to update the unified client embedding as new events are observed and/or support for new domains is added.

At 101, update events from multiple source domains are captured. For example, events on different source domain platforms are observed and captured as event updates. An observed event is encoded as an event update with the time of the event. For example, an event update can be encoded with the source domain, the client, a time stamp of the event, and a payload describing the event. Different domains and event updates can utilize different payload types that include different observed properties. In various embodiments, the event updates observed across different source domains are used to create a unified client embedding.

At 103, a unified machine learning embedding is generated using captured events. For example, using the event updates captured at 101, a unified machine learning embedding is generated. In some embodiments, the event updates are first transformed into an encoder input space, such as a smaller fixed-dimensional vector. For example, the event updates can be transformed into an encoder input space using a feed forward network such as a 2-layer feed forward neural network. Using the transformed event updates, a unified machine learning embedding can be generated using a temporally-masked encoder with gated updates. For example, once client updates are converted into the encoder input space, the input into the encoder is batched and merged with a hidden client embedding and then reduced into a smaller dimension to determine a weighted masked average. The transformed output of the temporally-masked encoder is an output embedding that can be passed through a gated update to generate a time-based unified machine learning embedding. In various embodiments, the generated unified machine learning embedding corresponds to a multidomain time series model.

At 105, results for a target domain are predicted using the unified machine learning embedding. Using the unified machine learning embedding generated at 103, results are predicted for one or more target domains. For example, a prediction result can be the probability a client purchases an item for a specific prediction target domain, such as an online shopping platform or a home delivery styling service. To make a target prediction, the most recent unified machine learning embedding for the client is utilized. In some embodiments, each target prediction is associated with a loss function, such as a binary cross entropy loss function. The prediction can utilize a target event that corresponds to an event update and includes similar components such as a domain, a client, and a payload describing the prediction outcomes. In various embodiments, the associated loss function is used to measure the predictions against outcomes from the payload.

At 107, the prediction results are applied for item selection. For example, using the scores predicted at 105, the prediction results are applied for the selection of items, such as physical and/or non-physical items, for a client. For example, physical items can include clothing items such as tops, bottoms, footwear, outerwear, and/or accessories, among other physical items and non-physical items can include videos, photos, ads, non-fungible tokens (NFTs), and/or articles, among other non-physical items. In some embodiments, the prediction results for one prediction target domain can be used to determine what items to display to the client when the client browses an online store via a website. As another example, for another prediction target domain, the prediction results can be used to determine what items to present to a stylist who is selecting a custom arrangement of items for the client as part of a home delivery styling service. In some embodiments, the prediction results for another prediction target domain are used as a factor to determine what items to display to the client in an application that presents pseudo-random items to the client to gather client preferences. For example, a client can select from "like" or "dislike" options for each presented item. Since the client should not be presented with only items the client is likely to purchase, in the example, the prediction score can be used as only one of multiple factors for item selection.

Figure 2:
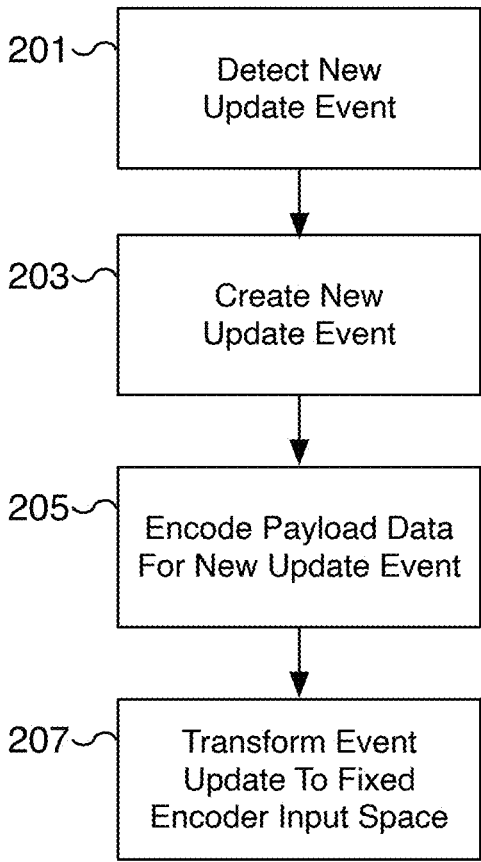
FIG. 2 is a flow diagram illustrating an embodiment of a process for capturing events from multiple domains for a multidomain time series recommendation process.

FIG. 2 is a flow diagram illustrating an embodiment of a process for capturing events from multiple domains for a multidomain time series recommendation process. Using the disclosed process, events observed on different source domains are captured as update events and used to generate a unified client embedding. The machine learning embedding corresponds to a multidomain time series model used by a multidomain time series recommendation process. In some embodiments, the process of FIG. 2 is performed at 101 of FIG. 1 at least in part at each of the different source domains. For example, an update entity associated with each source domain, such as a mobile application, an online shopping website, a client survey portal, or a styling application for a home delivery styling service, can observe and initiate capturing of the update event for each respective source domain.

At 201, a new event update is detected. For example, a new event that corresponds to an update event is observed on a source domain. The event can pertain to one or more physical items associated with the client, such as a client preference for certain items, client sizing for certain item types, and/or a client decision related to certain items, etc. For example, a new event update can be associated with a profile update, an updated or submitted client survey, a viewed item, a purchased item, a returned item, an item added to a virtual shopping bag, or a rating submitted for an item, among other events. In some embodiments, the event pertains to a non-physical item such as a video, photo, advertisement, non-fungible token (NFT), or an article, among other non-physical items. In various embodiments, the event is observed by an update entity monitoring the source domain platform. New source domains and/or event update types can be supported by creating a new event update type with the appropriate payload encoding. The payload fields of the new event update type are configured to describe the features and/or information relevant to the newly observed event type. In some embodiments, each source domain can utilize its own unique payload.

At 203, a new update event is created. For example, a new update event is created that includes the source domain, the client, a timestamp associated with the event, and a payload. The source domain describes where the update originated from, such as from a specific mobile application, a specific website or portal, a styling application, a client survey, or another source domain and can be encoded as a source domain identifier. In various embodiments, the client is represented by a unique client identifier and the client information references the client for which the update refers. Each event update is associated with a specific time. By including the time of the event, the client embedding is dynamically updated to reflect the client's preferences as they evolve over time. At 203, the source domain, the client, and the timestamp are encoded for the update event.

At 205, the payload data is encoded for the new update event. For example, the new update event created at 203 is encoded with payload data at 205 using features and/or information from the observed update. In various embodiments, the payload fields of the update event can differ depending on the source of the event and/or the type of event observed. Observed events of the same type and/or context have the same payload structure. For example, a checkout event can contain an item embedding and an outcome that corresponds to whether a client purchased the item. As another example, a payload for a specific event update can include fields describing an item (such as an item or SKU identifier), whether the item was purchased (such as a sold status identifier), a price rating for the item, a price change of the item, a fit rating for the item, and a style rating for the item. In some embodiments, an update event such as a submitted survey or updated profile can include preferences and/or information associated with the client and is included in the payload data. For example, the payload data can include a birthday, a weight, a height, a foot size, a shirt size, a bottom size, a cup size, a color preference, a pattern preference, a fabric preference, one or more preferred brands, one or more brands to avoid, and an occupation, among other information depending on the observed event.

At 207, the event update is transformed to a fixed encoder input space. For example, the constructed event update that includes the encoded payload data is converted to one or more vectors. In some embodiments, the event update is first encoded into a larger single vector, such as by concatenating the different event update fields, before being transformed to a fixed encoder input space. For example, a timestamp can be converted to a fixed-dimensional vector before concatenating the converted timestamp with the converted payload data. In some embodiments, the event update is transformed to a fixed encoder input space using a feed forward network such as a 2-layer feed forward neural network. For example, a vector corresponding to the event update can be represented as a $1 \times 77$ vector that is transformed into a $1 \times 64$ encoder input vector using a feed forward network.

Figure 3:
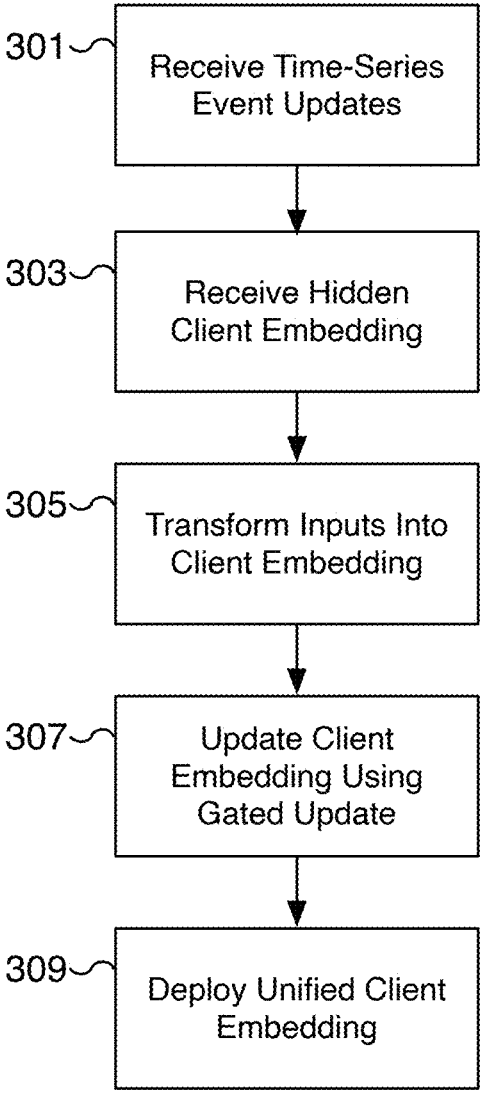
FIG. 3 is a flow diagram illustrating an embodiment of a process for generating a unified machine learning embedding for a multidomain time series recommendation process using capturing event updates from multiple domains.

FIG. 3 is a flow diagram illustrating an embodiment of a process for generating a unified machine learning embedding for a multidomain time series recommendation process using capturing event updates from multiple domains. Using the disclosed process, event updates converted to the proper encoder input space are used to generate a unified client embedding for a multidomain time series model. Using the trained multidomain time series model, the multidomain time series recommendation process can predict results for different prediction target domains. In some embodiments, the process of FIG. 3 is performed using a temporally-masked encoder and one or more gated recurrent units. In some embodiments, the process of FIG. 3 is performed at 103 of FIG. 1 using received events from different source domains that are timestamped and transformed to a fixed input dimension. In some embodiments, the received events are captured from the different source domains and converted to the fixed input dimension using the process of FIG. 2.

At 301, time-series event updates are received. For example, one or more event updates with timestamps and associated payloads for a client are received. The different event updates share the same fixed encoder input format, such as a $1 \times 64$ vector. The updates can correspond to the updates observed since the last unified client embedding was generated. In various embodiments, the update events are sorted based on their associated timestamps.

At 303, a hidden client embedding is received. For example, the appropriate hidden client embedding is received. In some embodiments, the hidden client embedding is the last generated embedding and the updates received at 301 correspond to the updates captured since the received hidden embedding was generated. In various embodiments, the hidden embedding shares the same converted fixed encoder input format as a received event update, such as a 1×64 vector.

At 305, the received inputs are transformed into a client embedding. For example, using the time-series event updates received at 301 and the hidden client embedding received at 303, the received inputs are transformed into an updated client embedding using a temporally-masked encoder. In some embodiments, the event updates are batched together before being concatenated with hidden client embedding. For example, event updates can be batched together into a specific batch size, such as 100 event updates. Once concatenated with the hidden client embedding, the data is reduced to a smaller dimension using a feed forward network such as a 2-layer feed forward neural network. For example, a 100×128 input can be reduced to 100×65 matrix with a 100×64 matrix representing the transformed embeddings and a 100×1 weight matrix to be applied to a mask. In some embodiments, a mask such as a triangular mask is applied to mask events that happen prior to any observation. After the mask is applied, the final portion of the temporally-masked encoder returns a weighted masked average. In the above example, the weighted masked average is a 100×64 output associated with a client embedding.

At 307, the client embedding is updated using a gated update. In some embodiments, a gated update is applied to the client embedding transformed at 305. For example, the transformed output from a temporally-masked encoder can be passed through one or more gated recurrent units. The gated recurrent units can be updated in parallel for improved performance. In various embodiments, the gated update receives both the client embedding transformed at 305 as well as the hidden client embedding received at 303 and outputs an updated hidden embedding that corresponds to an updated unified client embedding.

At 309, the unified client embedding is deployed. For example, the multidomain time series recommendation process can use the unified client embedding updated at 307 to perform predictions for one or more different prediction target domains. In various embodiments, each prediction target domain is configured for prediction using a target event with a corresponding payload. The prediction target domain is also configured with a loss function for scoring predictions against outcomes from the payload. In the event additional update events are observed, the unified client embedding can be updated using the newly observed update events by repeating the process of FIG. 3.

Figure 4:
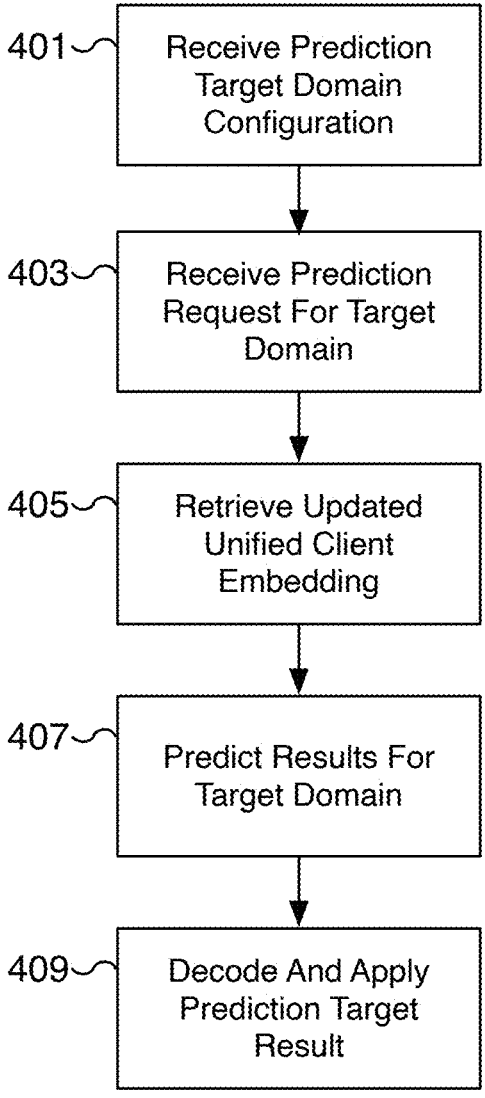
FIG. 4 is a flow diagram illustrating an embodiment of a process for predicting results for different prediction target domains using a multidomain time series recommendation process.

FIG. 4 is a flow diagram illustrating an embodiment of a process for predicting results for different prediction target domains using a multidomain time series recommendation process. Using the disclosed process, a multidomain time series model with a corresponding unified client embedding is used to predict scores associated with physical and/or non-physical items for a client. For example, physical items can include clothing items such as tops, bottoms, footwear, outerwear, and/or accessories, among other physical items and non-physical items can include videos, photos, ads, non-fungible tokens (NFTs), and/or articles, among other non-physical items. The predictions can be targeted to different prediction domains, such as a mobile application for gathering client preferences, an online shopping website, and/or a styling application used by stylists for preparing a custom arrangement of items for the client as part of a home delivery styling service. In some embodiments, the process of FIG. 4 is performed at 105 and/or 107 of FIG. 1 using a multidomain time series recommendation process. In some embodiments, the unified client embedding of the multidomain time series recommendation process is the unified machine learning embedding generated using the process of FIG. 3.

At 401, a prediction target domain configuration is received. For example, to support a new target domain, a prediction target domain is first configured. In some embodiments, a prediction target domain utilizes a target event that is similar to the update events used to capture the client embedding across different source domains. The target event can include similar components as an update event such as a domain, a client, and a payload. For example, a domain field describes the target domain, such as a mobile application, a shopping website, or a stylist application, among others, and the client field references the client for which the prediction is for. In some embodiments, each target domain is represented by a domain identifier and/or each client is represented by a unique client identifier. In various embodiments, the payload data describes the prediction outcomes and can include multiple different fields for different prediction outcomes. In some embodiments, each target event can have a unique payload and the payload fields are used at least in part to configure what prediction outcomes to predict for each of the prediction target domains. In some embodiments, the target event also includes a timestamp that corresponds to the time associated with the desired prediction outcomes.

In various embodiments, each target event is also configured with an associated loss function. The loss function can be used to measure the predictions against outcomes from the payload. For example, a loss function can be configured to use a binary cross entropy loss function for the probability that an item is purchased. This allows the recommendation process to be used for determining the accuracy between items for the client at the time of item selection. As another example, a loss function can be configured to use a grouped binary cross entropy loss function to measure outcomes as a group of items such as a custom arrangement of items prepared by a stylist. In various embodiments, different loss functions can be configured based on the desired prediction result.

At 403, a prediction request for a target domain is received. For example, a request for a prediction for a specific target domain is received. In various embodiments, the target domain was first configured at 401 and a corresponding target event for the domain is received at 403. In some embodiments, the target event defines the desired prediction result including the time associated with the prediction, the client, the target domain, and using the payload, the desired prediction outcomes. In various embodiments, the prediction request received at 403 for a target domain is triggered by the occurrence of an event that involves prediction results. For example, when a client selects a category page, such as tops, bottoms, shoes, or jackets, among others, the selection of the specific category page is an event that requires prediction results and initiates a prediction request. Similarly, the selection of a preview page to view an arranged outfit, the selection of a page to view a custom item arrangement such as one curated by a stylist for the client, a request for a custom item arrangement by a stylist, or an interaction with a style preferences application that displays pseudo-random items to the client to gather their preferences can each trigger a prediction request for the corresponding target domain.

At 405, the updated unified client embedding is retrieved. For example, the unified client embedding that corresponds to the time associated with the prediction request received is retrieved. In various embodiments, multiple client embeddings can be persisted, and each reflects the client's embedding at different times. In some embodiments, the timestamp encoded in the target event of the prediction request received at 403 is used to retrieve the appropriate client embedding and/or to determine if the existing client embeddings are not up to date. For example, an updated client embedding may be required (and generated) based on newly observed events that are not reflected in the latest client embedding.

At 407, results are predicted for the target domain. For example, using the updated unified client embedding retrieved at 405, prediction results are made. In some embodiments, the outcomes predicted are based on the payload of a target event of the prediction request received at 403. Example prediction results can include the probability a client purchases an item conditional to the item being included in a custom arrangement by a stylist or the probability a client purchases an item displayed on an online shopping portal. In some embodiments, an associated loss function is used for measuring the predictions against outcomes from the payload. In some embodiments, the client embedding is mapped to a target domain space, such as an item embedding space, to make the desired prediction. For example, the predicted probability a certain item, such as a physical or non-physical item, is purchased by a client can include first retrieving an item embedding for the specific item. The client embedding is then transformed to the item embedding space and used to determine the predicted probability the client will purchase the item.

In some embodiments, utilizing the unified client embedding for prediction results includes retrieving additional information such as a list of potential items to present to the client, a list of stylists available for the client, a list of target domains where certain items can be displayed, and/or a list of customers, among other information. Using the received information, different types of prediction scores can be determined. For example, using a list of potential items to present to a client, for each item received, a client-item score is predicted using the client embedding and corresponding item embedding. Once the client-item scores are predicted for the different items, at 409, the predicted scores can be ranked, for example, by the likelihood that the client will purchase an item.

At 409, the prediction target results are decoded and applied. For example, the predictions made for the target domain are decoded and applied for use in the target domain platform. In some embodiments, the results are extracted from the target event payload and then provided for the associated domain, such as for selecting and/or displaying items on a mobile application or website. For example, the prediction results for one prediction target domain can be applied to determine what items to display to the client when the client browses an online store via a website. As another example, for another prediction target domain, the prediction results can be applied to determine what items to present to a stylist who is selecting a custom arrangement of items for the client as part of a home delivery styling service. In some embodiments, client-item scores are predicted for multiple items and the predicted scores are ranked. Only the items that meet the required scores are then presented for display to the client or stylist. In various embodiments, information related to one or more of the ranked items is provided for use in the target domain based on the corresponding predicted client-item scores.

Figure 5:
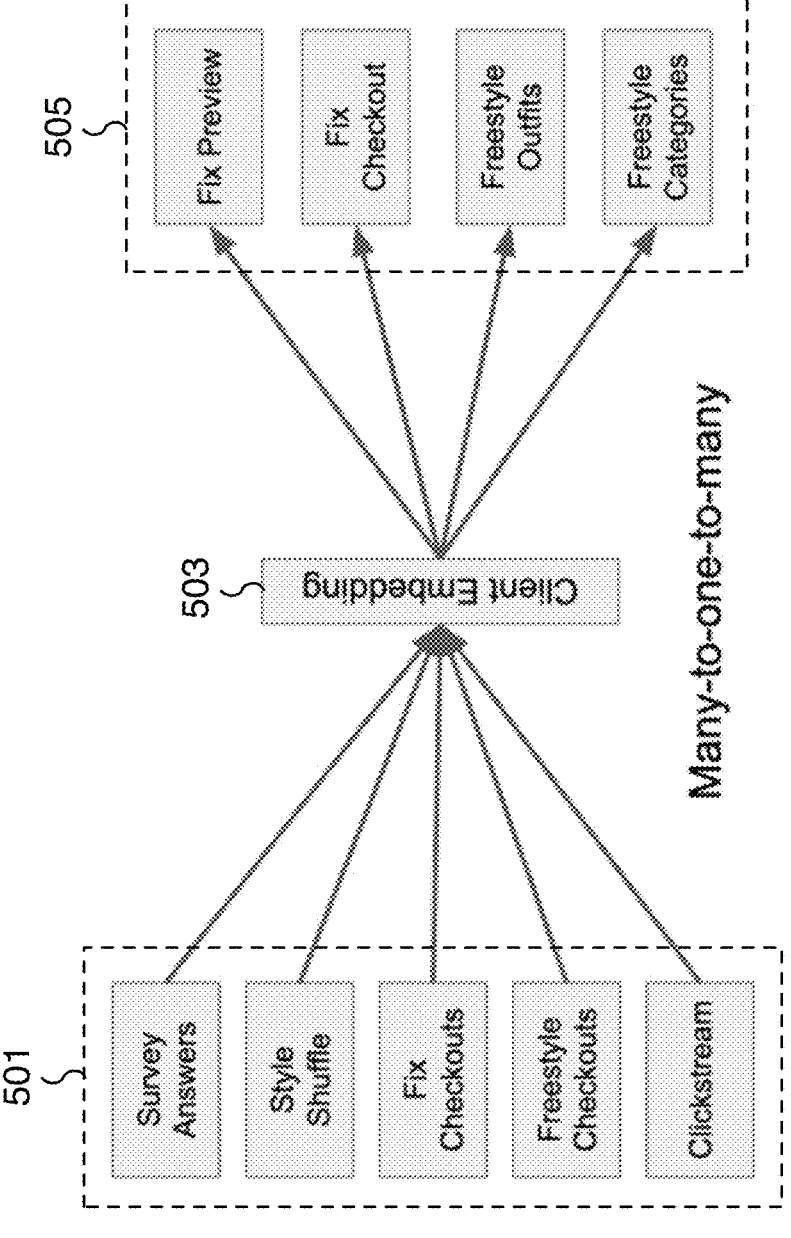
FIG. 5 is a diagram illustrating the mapping between source domains, a unified client embedding, and target prediction domains for a multidomain time series recommendation process.

FIG. 5 is a diagram illustrating the mapping between source domains, a unified client embedding, and target prediction domains for a multidomain time series recommendation process. In the example shown, the relationship diagram includes source domains 501, unified client embedding 503, and target prediction domains 505. The relationship is a many-to-one-to-many relationship that maps multiple source domains of source domains 501 to a single unified client embedding shown as unified client embedding 503. The single unified client embedding is then mapped to multiple prediction domains of target prediction domains 505. In some embodiments, the relationship diagram of FIG. 5 is used for predicting a recommendation by a multidomain time series recommendation process. In some embodiments, the prediction process is described by the process of FIGS. 1-4.

In various embodiments, source domains 501 includes multiple different source domain platforms. In the example shown, source domains 501 includes Survey Answers, Style Shuffle, Fix Checkouts, Freestyle Checkouts, and Clickstream. Each is a different source domain associated with items, such as physical and/or non-physical items, for a client. For example, Survey Answers are answers provided by the client with respect to one or more physical and/or non-physical items and can include item specific information such as an item, a style preference, a pricing preference, and whether the client would purchase the item. As another example, Style Shuffle is a mobile or web application that presents different items to the client to gather the client's preferences. For example, the client can select from "like" or "dislike" options for each presented item. Fix Checkouts and Freestyle Checkouts are different formats for purchasing items. In Fix Checkouts, the client is presented with a custom arrangement curated by a stylist whereas in Freestyle Checkout, the client initiates the item selection without a stylist. A Clickstream is an input domain associated with the sequence of clicks or other client interactions that can be observed for client preferences. In various embodiments, event updates associated with the different source domains of source domains 501 are captured using the process of FIG. 2 for generating client embedding 503.

In the example shown, client embedding 503 is a unified machine learning embedding associated with a single client. In some embodiments, client embedding 503 is generated using the process of FIG. 3 from event updates observed by entities of source domains 501. In various embodiments, multiple client embeddings are persisted, each associated with a specific time. Based on the time associated with a prediction request, the appropriate version of the client embedding is utilized by the multidomain time series recommendation process for predicting results. When performing prediction results, predictions are directed to a specific target domain of target prediction domains 505. For example, predictions can be made for Fix Preview, Fix Checkout, Freestyle Outfits, and Freestyle Categories, depending on the desired use case. Each of the target prediction domains of target prediction domains 505 can utilize the inferred prediction results as appropriate, such as for determining what items to present for the client (or the client's stylist) and what order to rank the items. In various embodiments, the predictions are made for a target prediction domain using the process of FIG. 4.

Figure 6:
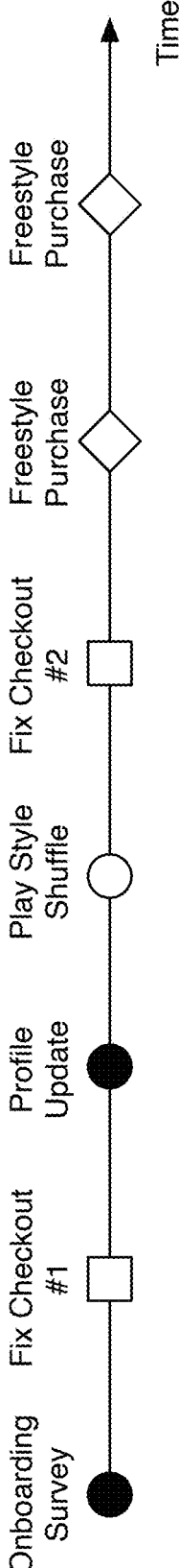
FIG. 6 is a timeline diagram illustrating different events used for generating a unified machine learning embedding for a multidomain time series recommendation process.

FIG. 6 is a timeline diagram illustrating different events used for generating a unified machine learning embedding for a multidomain time series recommendation process. In the example shown, events related to a specific client are observed and captured over time. The four different markers represent four different source domains: a website (black circle), a home delivery styling service "Fix Checkout" (white square), a mobile styling preferences application "Play Style Shuffle" (white circle), and a client-directed online purchase platform "Freestyle Purchase" (white diamond). Each event is annotated under the source domain marker with the event observed. For example, for a website domain represented by a black circle, two events are observed and captured. The first is an onboarding survey where the client provides client preferences and/or information such as style, size, needs, price range, etc., and the second is a profile update provided by the client. With a profile update event, the client can update their preferences to reflect changes, such as changes in style, size, needs, price range, etc. Other client preferences and/or information can be provided including a birthday, a weight, a height, a foot size, a shirt size, a bottom size, a cup size, a color preference, a pattern preference, a fabric preference, one or more preferred brands, one or more brands to avoid, and an occupation, among other information.

In addition to the website domain, three additional source domains are shown on the timeline of FIG. 6. The event updates associated with a home delivery styling service "Fix Checkout" represented by a white square are two different purchases associated with two different custom arrangements of items, where each arrangement is selected by a stylist for the client. For each custom arrangement of items, the client can select to purchase any number of the items in the arrangement and can provide feedback on any of the included items. The event updates associated with the mobile styling preferences application "Play Style Shuffle" represented by the white circle are client preferences captured when the client is presented with different items in the Style Shuffle application. The last two event updates are associated with the client-directed online purchase platform "Freestyle Purchase" represented by the white diamond. These event updates capture client preferences and features associated with two different online purchases where the client selects the items (instead of a stylist as with Fix Checkout). In various embodiments, the different event updates are encoded with their respective source domain, a client identifier, a timestamp, and a payload of client features. The corresponding encoded update events are used to update a unified client embedding, which in turn is used to predict results for different target prediction domains.

Figure 7:
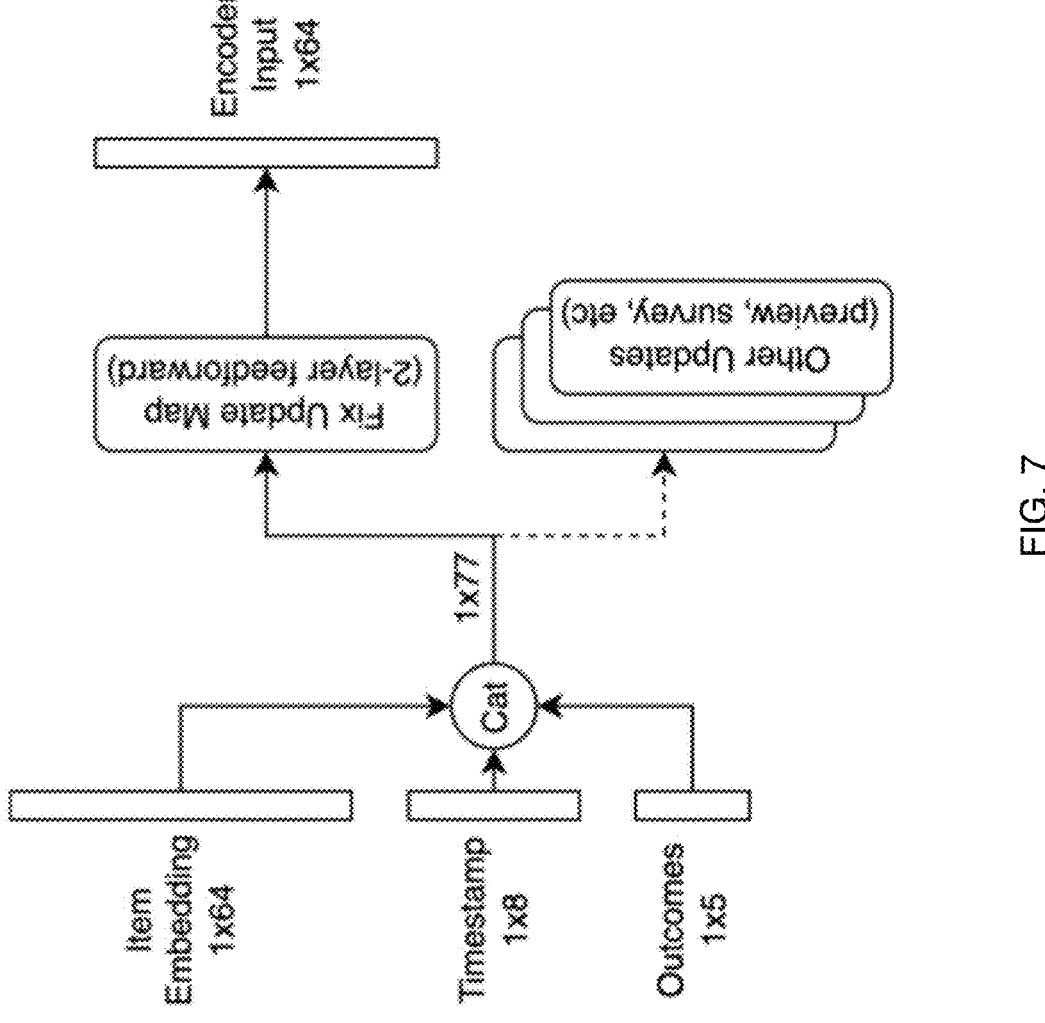
FIG. 7 is a block diagram illustrating an embodiment of a processing pipeline for preparing update events for generating a unified client embedding.

FIG. 7 is a block diagram illustrating an embodiment of a processing pipeline for preparing update events for generating a unified client embedding. In the example shown, the data from an update event are converted to an encoder input format for input to a temporally-masked encoder. In some embodiments, the components of FIG. 7 are used at 101 of FIG. 1 and/or at 207 of FIG. 2 to transform an event update to a fixed encoder input space.

In the example shown, the event update corresponds to a checkout by the client for a particular item. For the example used in FIG. 7, the payload of the event update includes an item embedding, timestamp, and outcomes. The item embedding describes the particular item and the outcome can correspond to whether the client purchased the item or not. In the example shown, the item embedding is a 1×64 vector and the outcomes are encoded as a 1×5 vector. Additionally, a timestamp represented as a 1×8 vector and associated with the event update is also used as an input to create a time-series event update. In various embodiments, the item embedding, timestamp, and outcomes are concatenated, for example, to create a 1×77 vector. Using the feed forward network, the vector is reduced to the fixed encoder input space, such as a 1×64 input vector for a temporally-masked encoder. In some embodiments, the feed forward network is a 2-layer feed forward neural network. As shown in the example, different source domains (such as other updates, preview updates, survey updates, etc.) can utilize different techniques (and different networks) to transform the input values into the fixed encoder input space.

Figure 8:
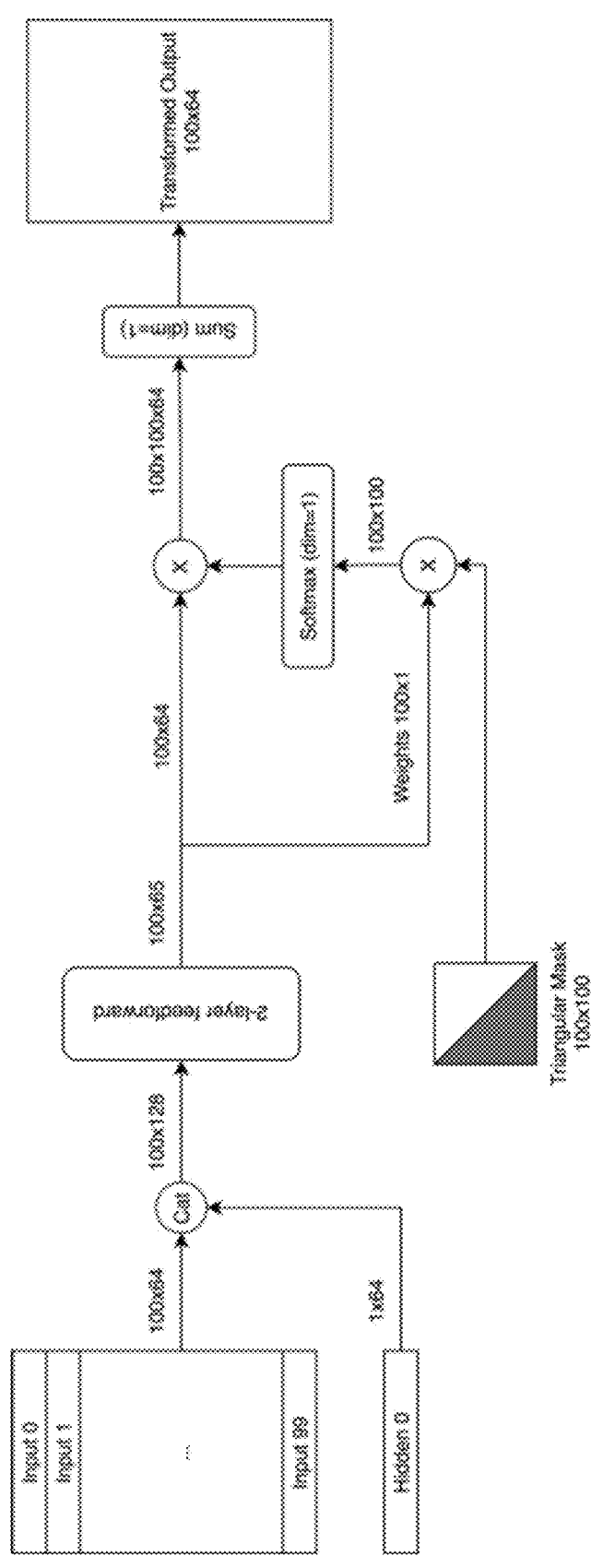
FIG. 8 is a block diagram illustrating an example processing pipeline for an embodiment of a temporally-masked encoder for generating a unified client embedding.

FIG. 8 is a block diagram illustrating an example processing pipeline for an embodiment of a temporally-masked encoder for generating a unified client embedding. In the example shown, event updates are received in a fixed encoder input format along with a hidden client embedding. In some embodiments, the event updates are converted using the processing pipeline of FIG. 7. In some embodiments, the components of FIG. 8 are used at 103 of FIG. 1 and/or at 301, 303, and/or 305 of FIG. 3 as part of the process of generating a unified machine learning embedding for a client.

In the example shown, the event updates are transformed into the input space of the temporally-masked encoder and are batched into example batch sizes of 100 updates to create a 100×64 matrix. The batched event updates are ordered by timestamp and are concatenated with the hidden client embedding represented as a 1×64 vector to create a 100×128 matrix. In various embodiments, this is reduced to a smaller dimension using a 2-layer feed forward network. In the example shown, the output of the feed forward network is a 100×65 matrix, with a 100×64 submatrix representing the transformed embeddings and a 100×1 submatrix containing weights to be applied to the mask matrix. In various embodiments, a triangular mask (shown as a 100×100 matrix) is used to create a weighted mask to mask any events that happen prior to any observation. As shown in FIG. 8, the final output of the temporally-masked encoder is a weighted masked average and can be represented as a 100×64 transformed output. In various embodiments, the output embeddings are then passed to a gated update such as the gated update shown in FIG. 9. In the example shown, dimensions such as the embedding dimension of 64 is used, although other dimensions can be appropriate as well.

Figure 9:
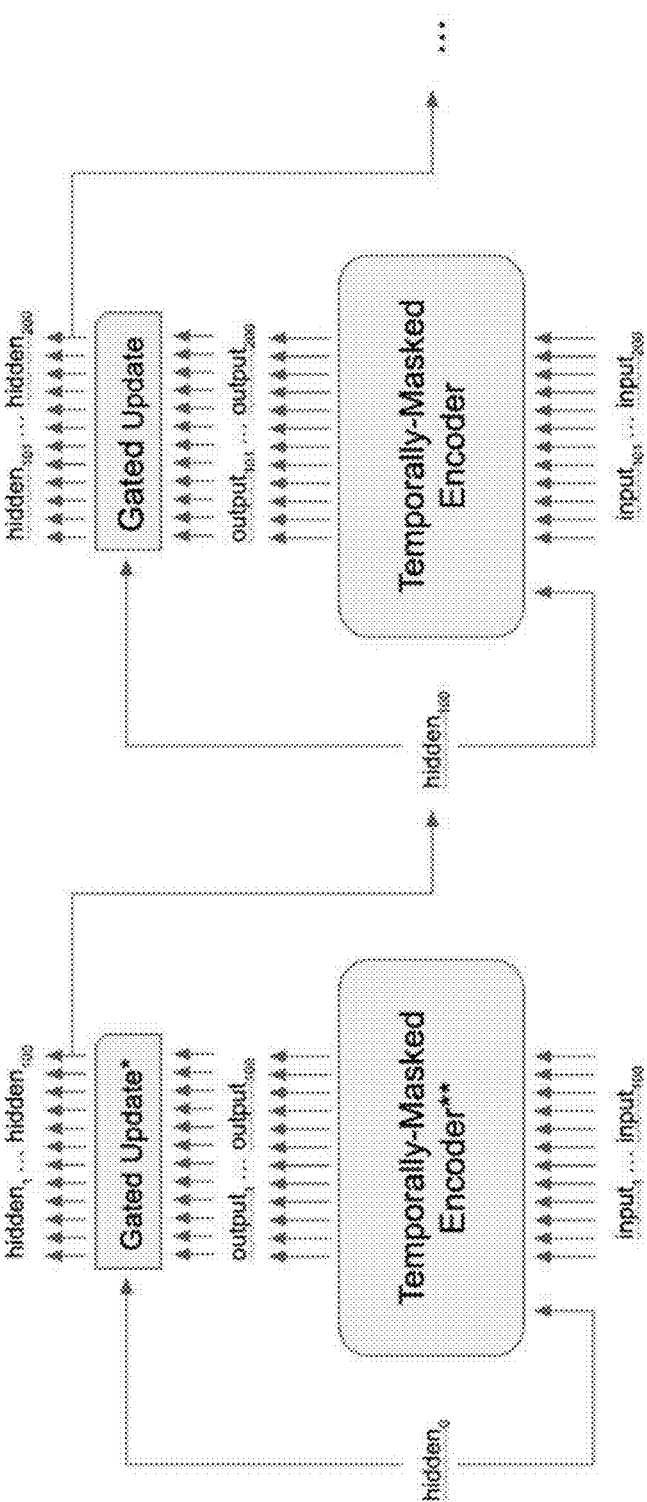
FIG. 9 is a block diagram illustrating an example processing pipeline for performing a gated update of a unified client embedding.

FIG. 9 is a block diagram illustrating an example processing pipeline for performing a gated update of a unified client embedding. In the example shown, the output of a temporally-masked encoder is passed through a gated update to generate an updated unified client embedding. In some embodiments, the temporally-masked encoders of FIG. 9 are described with respect to FIG. 8. In some embodiments, the components of FIG. 9 are used at 103 of FIG. 1 and/or at 307 of FIG. 3 as part of the process of generating an updated unified machine learning embedding for a client.

In the example shown, each temporally-masked encoder feeds a gated update. In various embodiments, each gated update can be implemented using one or more gated recurrent units. For example, multiple gated recurrent units can be operated in parallel for improved performance. As shown in the example, the output of a temporally-masked encoder passes through a gated update along with the previous hidden client embedding to generate an updated hidden client embedding. As more event updates are captured, the updated hidden client embedding is used along with a batch of new time-series event updates to generate an updated unified client embedding.

Figure 10:
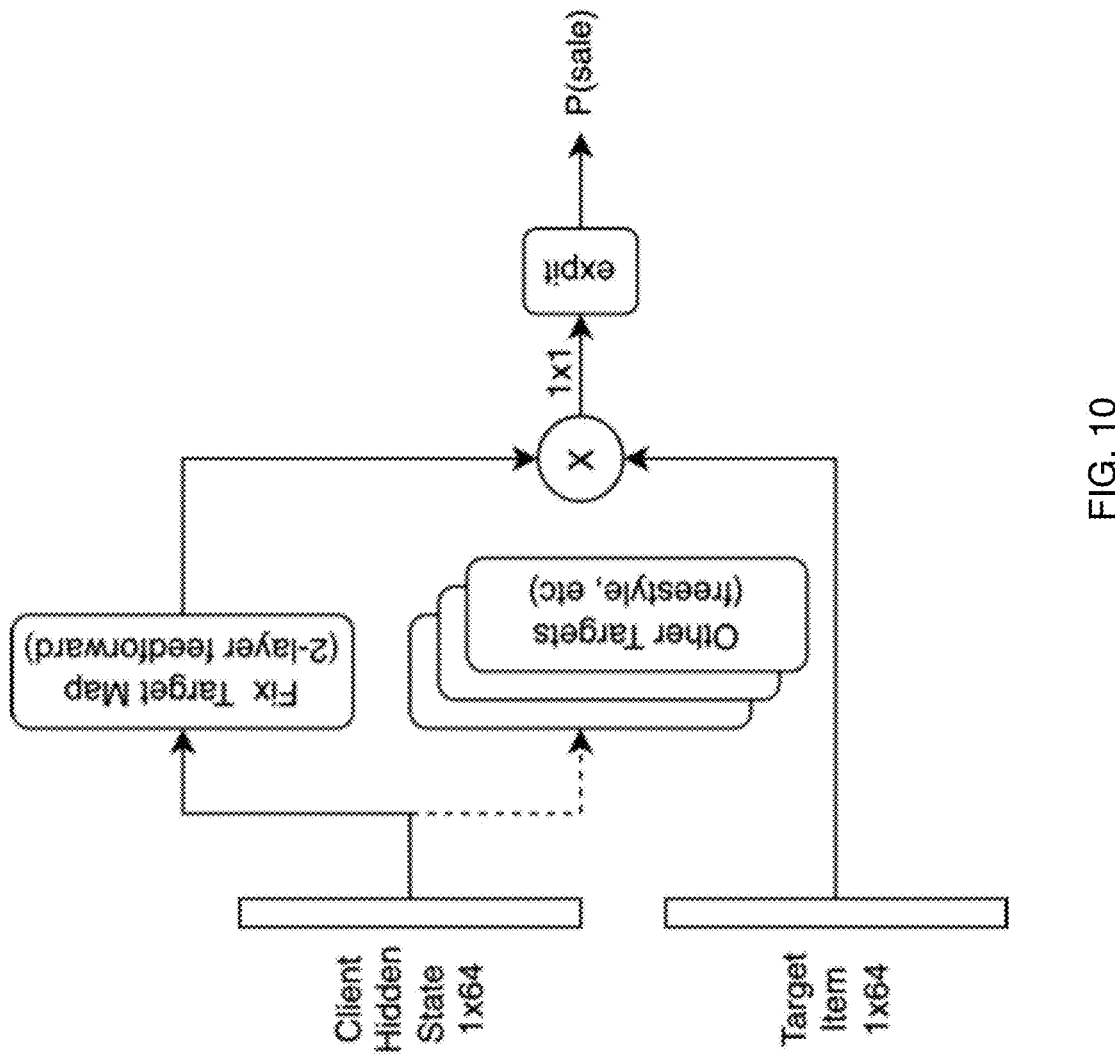
FIG. 10 is a block diagram illustrating an embodiment of a processing pipeline for predicting results for a target domain using a unified client embedding.

FIG. 10 is a block diagram illustrating an embodiment of a processing pipeline for predicting results for a target domain using a unified client embedding. In the example shown, the prediction target domain is selected from multiple different target domains and used to generate a prediction result. In some embodiments, the client hidden state is the updated unified client embedding generated as described with respect to FIG. 9. In some embodiments, the components of FIG. 10 are used at 105 of FIG. 1 and/or by the process of FIG. 4 for predicting results for different prediction target domains.

In various embodiments, the prediction result for the target domain is a function of the client state. In the example shown, the prediction requested is for the probability that a client purchases an item conditional to the item being sent to the client as part of a custom arrangement of items selected by a stylist. As described herein, each target prediction domain and/or target event can be configured with an associated loss function, such as a binary cross entropy loss function, that can be used to measure predictions against outcomes from a payload in a target event. In the example of FIG. 10, the desired prediction outcome is associated with a target item and the item embedding of the target item is retrieved. Using the most recent client embedding prior to the timestamp of the target event, the unified client embedding, shown as a 1×64 client hidden state vector, is transformed to the item embedding space using a 2-layer feed forward neural network. As shown in the example, the dot product of the transformed client embedding and the target item embedding provides the predicted logits, which can be transformed into the predicted probability by applying the expit function. In various embodiments, the predicted probability is then applied for use in the target domain platform, such as a styling tool for a home delivery styling service. For example, the predicted probability for the target item can be used to rank the target item against other scored items in the available inventory. The scored items can then be displayed based on their client-item scores to a stylist in a styling tool for selecting a custom arrangement of items for the client.

Figure 11:
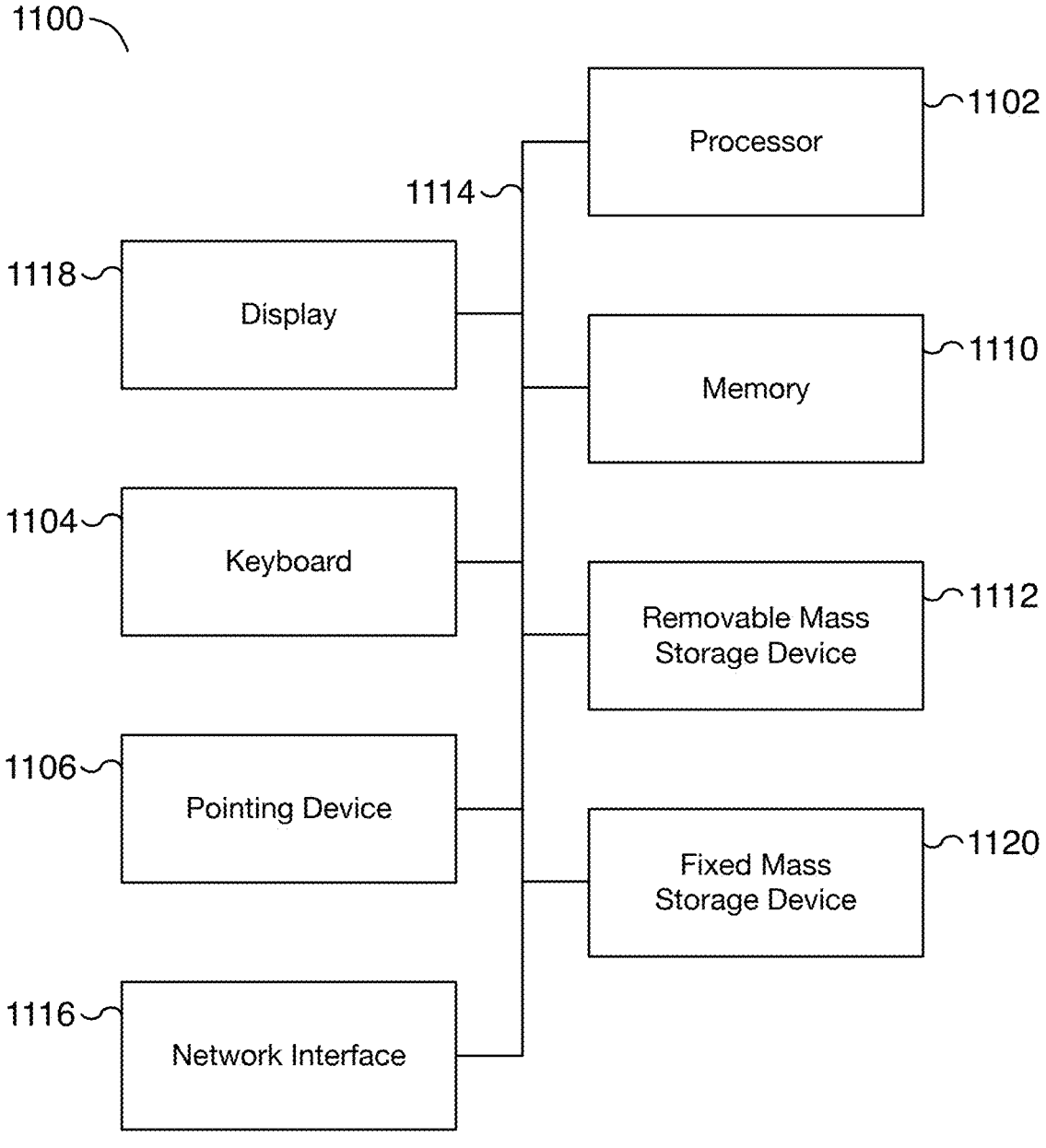
FIG. 11 is a functional diagram illustrating a programmed computer system for predicting a recommendation using a multidomain time series recommendation process in accordance with some embodiments.

FIG. 11 is a functional diagram illustrating a programmed computer system for predicting a recommendation using a multidomain time series recommendation process in accordance with some embodiments. As will be apparent, other computer system architectures and configurations can be utilized for predicting a recommendation using a multidomain time series recommendation process. Examples of computer system 1100 include the computer systems used by a multidomain time series recommendation process and system for capturing update events from different source domains, converting captured events into the appropriate formats for generating a unified client embedding, training the multidomain time series model for a client, and predicting recommendations for target prediction domains. Computer system 1100, which includes various subsystems as described below, includes at least one microprocessor subsystem (also referred to as a processor or a central processing unit (CPU)) 1102. For example, processor 1102 can be implemented by a single-chip processor or by multiple processors. In some embodiments, processor 1102 is a general purpose digital processor that controls the operation of the computer system 1100. Using instructions retrieved from memory 1110, the processor 1102 controls the reception and manipulation of input data, and the output and display of data on output devices (e.g., display 1118). In various embodiments, one or more instances of computer system 1100 can be used to implement at least portions of the processes of FIGS. 1-4.

Processor 1102 is coupled bi-directionally with memory 1110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1102. Also as is well known in the art, primary storage typically includes basic operating instructions, program code, data and objects used by the processor 1102 to perform its functions (e.g., programmed instructions). For example, memory 1110 can include any suitable computer-readable storage media, described below, depending on whether, for example, data access needs to be bi-directional or unidirectional. For example, processor 1102 can also directly and very rapidly retrieve and store frequently needed data in a cache memory (not shown).

A removable mass storage device 1112 provides additional data storage capacity for the computer system 1100, and is coupled either bi-directionally (read/write) or unidirectionally (read only) to processor 1102. For example, storage 1112 can also include computer-readable media such as magnetic tape, flash memory, PC-CARDS, portable mass storage devices, holographic storage devices, and other storage devices. A fixed mass storage 1120 can also, for example, provide additional data storage capacity. The most common example of mass storage 1120 is a hard disk drive. Mass storages 1112, 1120 generally store additional programming instructions, data, and the like that typically are not in active use by the processor 1102. It will be appreciated that the information retained within mass storages 1112 and 1120 can be incorporated, if needed, in standard fashion as part of memory 1110 (e.g., RAM) as virtual memory.

In addition to providing processor 1102 access to storage subsystems, bus 1114 can also be used to provide access to other subsystems and devices. As shown, these can include a display monitor 1118, a network interface 1116, a keyboard 1104, and a pointing device 1106, as well as an auxiliary input/output device interface, a sound card, speakers, and other subsystems as needed. For example, the pointing device 1106 can be a mouse, stylus, track ball, or tablet, and is useful for interacting with a graphical user interface.

The network interface 1116 allows processor 1102 to be coupled to another computer, computer network, or telecommunications network using a network connection as shown. For example, through the network interface 1116, the processor 1102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1102 can be used to connect the computer system 1100 to an external network and transfer data according to standard protocols. For example, various process embodiments disclosed herein can be executed on processor 1102, or can be performed across a network such as the Internet, intranet networks, or local area networks, in conjunction with a remote processor that shares a portion of the processing. Additional mass storage devices (not shown) can also be connected to processor 1102 through network interface 1116.

An auxiliary I/O device interface (not shown) can be used in conjunction with computer system 1100. The auxiliary I/O device interface can include general and customized interfaces that allow the processor 1102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 11 is but an example of a computer system suitable for use with the various embodiments disclosed herein. Other computer systems suitable for such use can include additional or fewer sub-systems. In addition, bus 1114 is illustrative of any inter-connection scheme serving to link the subsystems. Other computer architectures having different configurations of subsystems can also be utilized.

Although the foregoing embodiments have been described in some detail for purposes of clarity of under-standing, the invention is not limited to the details provided. There are many alternative ways of implementing the inven-tion. The disclosed embodiments are illustrative and not restrictive.

What is claimed is:

1. A method, comprising:
   capturing events from a plurality of source domains by a plurality of entities for a plurality of different physical items as time series data;
   generating a unified machine learning embedding includ-ing by:
      transforming the captured events into an encoder input space;
      processing the transformed events using a temporally-masked encoder that merges the transformed events with a hidden client embedding to determine a weighted masked average; and
      passing an output of the temporally-masked encoder through a gated update to generate the unified machine learning embedding; and
   using the unified machine learning embedding for predic-tions in different domains of a plurality of prediction target domains.

2. The method of claim 1, wherein capturing the events from the plurality of the source domains includes creating an update event for a specific source domain, wherein the update event is associated with a source domain identifier, a client identifier, a timestamp, and a payload.

3. The method of claim 2, wherein the update event corresponds to a profile update, an updated client survey, a viewed item, a purchased item, a returned item, an item added to a virtual shopping bag, or a rating submitted for an item.

4. The method of claim 2, wherein the payload of the update event is based on the specific source domain.

5. The method of claim 2, wherein the payload includes one or more of the following: an item identifier, a sold status identifier, a price rating, a price change, a fit rating, or a style rating.

6. The method of claim 2 wherein the payload includes one or more of the following: a birthday, a weight value, a height value, a foot size, a shirt size, a bottom size, a cup size, a color preference, a pattern preference, a fabric preference, one or more preferred brands, one or more brands to avoid, or an occupation.

7. The method of claim 1, wherein using the unified machine learning embedding for the predictions in the different domains of the plurality of prediction target domains includes creating a target event, wherein the target event is associated with a target prediction domain identifier, a client identifier, and a payload, and wherein the payload identifies one or more prediction outcomes.

8. The method of claim 7, wherein the target event is further associated with a timestamp.

9. The method of claim 1, wherein a loss function is configured for each of the different domains of the plurality of prediction target domains.

10. The method of claim 1, further comprising sorting the captured events by time.

11. The method of claim 1, wherein using the unified machine learning embedding for the predictions in the different domains of the plurality of prediction target domains includes receiving a plurality of items and predict-ing corresponding client-item scores for each of the items of the received plurality of items.

12. The method of claim 11, further comprising display-ing information related to one or more of the items of the received plurality of items based on the corresponding predicted client-item scores, wherein the information is provided for one of the different domains of the plurality of prediction target domains.

13. The method of claim 1, further comprising receiving a prediction request, wherein the prediction request is asso-ciated with one or more of the following: a selection of an item category, a selection to view an arranged outfit, a selection to view a custom item arrangement, a request for a custom item arrangement, or a selection to view a pseudo-random item.

14. A system, comprising:
   one or more processors; and
   a memory coupled to the one or more processors, wherein the memory is configured to provide the one or more processors with instructions which when executed cause the one or more processors to:
      capture events from a plurality of source domains by a plurality of entities for a plurality of different physi-cal items as time series data;
      generate a unified machine learning embedding includ-ing by causing the one or more processors to:
         transform the captured events into an encoder input space:
         process the transformed events using a temporally-masked encoder that merges the transformed events with a hidden client embedding to deter-mine a weighted masked average; and
         pass an output of the temporally-masked encoder through a gated update to generate the unified machine learning embedding; and
      use the unified machine learning embedding, generate predictions in different domains of a plurality of prediction target domains.

15. The system of claim 14, wherein capturing the events from the plurality of the source domains includes creating an update event, wherein the update event is associated with a source domain identifier, a client identifier, a timestamp, and a payload.

16. The system of claim 15, wherein the update event corresponds to one or more of the following: a profile update, an updated client survey, a viewed item, a purchased item, a returned item, an item added to a virtual shopping bag, or a rating submitted for an item.

17. The system of claim 14, wherein generating predictions in the different domains of the plurality of prediction target domains includes creating a target event, wherein the target event is associated with a target prediction domain identifier, a client identifier, and a payload, and wherein the payload identifies one or more prediction outcomes.

18. The system of claim 14, wherein generating predictions in the different domains of the plurality of prediction target domains includes receiving a plurality of items and predicting client-item scores for each of the items of the received plurality of items.

19. The system of claim 14, wherein the memory is further configured to provide the one or more processors with instructions which when executed cause the one or more processors to receive a prediction request, wherein the prediction request is associated with one or more of the following: a selection of an item category page, a selection of an arranged outfit page, a selection to view a custom item arrangement, a request for a custom item arrangement, or a selection to view a pseudo-random item.

20. A computer program product, the computer program product being embodied in a non-transitory computer readable storage medium and comprising computer instructions for:

capturing events from a plurality of source domains by a plurality of entities for a plurality of different physical items as time series data;

generating a unified machine learning embedding including by:

transforming the captured events into an encoder input space;

processing the transformed events using a temporally-masked encoder that merges the transformed events with a hidden client embedding to determine a weighted masked average; and passing an output of the temporally-masked encoder through a gated update to generate the unified machine learning embedding; and using the unified machine learning embedding for predictions in different domains of a plurality of prediction target domains.

* * * * *